United States Patent
Kawamura et al.

(10) Patent No.: US 8,462,234 B2
(45) Date of Patent: Jun. 11, 2013

(54) IMAGE PICKUP APPARATUS AND DARK CURRENT CORRECTION METHOD THEREFOR

(75) Inventors: Noriko Kawamura, Saitama (JP); Yoshinori Furuta, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/639,458

(22) PCT Filed: Oct. 27, 2011

(86) PCT No.: PCT/JP2011/074839
§ 371 (c)(1), (2), (4) Date: Oct. 4, 2012

(87) PCT Pub. No.: WO2012/057277
PCT Pub. Date: May 3, 2012

(65) Prior Publication Data
US 2013/0021497 A1      Jan. 24, 2013

(30) Foreign Application Priority Data
Oct. 29, 2010 (JP) ................................. 2010-244824

(51) Int. Cl.
*H04N 9/64* (2006.01)
(52) U.S. Cl.
USPC ......................................... 348/243; 348/250
(58) Field of Classification Search
USPC ................. 348/231.1, 241, 243–247, 250
See application file for complete search history.

(56) References Cited

U.S. PATENT DOCUMENTS

| | | | |
|---|---|---|---|
| 7,787,033 B2 * | 8/2010 | Rossi et al. | 348/244 |
| 8,227,734 B2 * | 7/2012 | Kameda | 250/208.1 |
| 2005/0242380 A1 | 11/2005 | Suzuki et al. | |
| 2009/0134433 A1 * | 5/2009 | Jung | 257/239 |
| 2010/0060768 A1 | 3/2010 | Ukita et al. | |

FOREIGN PATENT DOCUMENTS

| | | | |
|---|---|---|---|
| JP | 2000-152098 A | 5/2000 | |
| JP | 2005-175930 A | 6/2005 | |
| JP | 2005-312805 A | 11/2005 | |
| JP | 2008-118293 A | 5/2008 | |
| JP | 2009-33321 A | 2/2009 | |
| JP | 2010-68056 A | 3/2010 | |
| JP | 2010-118876 A | 5/2010 | |

* cited by examiner

*Primary Examiner* — Sinh Tran
*Assistant Examiner* — Mark Monk
(74) *Attorney, Agent, or Firm* — Birch, Stewart, Kolasch & Birch, LLP

(57) ABSTRACT

Disclosed are an image pickup apparatus and a dark current correction method that make it possible to correct the dark current at high precision without using a driving pattern of a peripheral circuit or a layout on an image pickup device chip. The image pickup apparatus includes an image pickup device provided with an effective pixel area, an OB part and a drive circuit of the image pickup device. In the dark current correction method, a black level (hereinafter, referred to as "second black level") included in the detected signal of the effective pixels of the effective pixel area is obtained (steps S3, S6, S7) based on a black level detected from the pixel of the OB pixels by performing a correction computation in accordance with an operation pattern (steps S1, S2, S5) of the drive circuit in which the temperature difference between the light receiving pixel part and the optical black part is occurred, and the second black level as a clamp level is subtracted from the level of the output signal of the effective pixels in accordance with the operation pattern of the drive circuit.

6 Claims, 7 Drawing Sheets

IMAGE PICKUP APPARATUS AND DARK CURRENT CORRECTION METHOD THEREFOR

TECHNICAL FIELD

The present invention relates to an image pickup apparatus equipped with a solid-state image pickup device and a dark current correction method for the same.

BACKGROUND OF THE INVENTION

An image pickup apparatus photographing an image of an object using a solid-state image pickup device receives an incident light from the object in the respective pixels (light receiving elements; photodiodes) within an effective pixel area of the solid-state image pickup device and outputs an picked-up image signal corresponding to the amount of the incident light from the respective pixels within the effective pixel area.

A signal caused by electrons excited by heat (which is referred to as a dark current) is generated from each of the pixels of the solid-state image pickup device even when the pixel is in the light-shielding state where no light is received. Therefore, a dark current component is included in the picked-up image signal output from the respective pixels within the effective pixel area, and thus, an image data of the object corresponding to the amount of the received light cannot be obtained unless the dark current component is subtracted from the picked-up image signal.

Therefore, a light-shielded pixel area called an optical black (OB) part is provided in a peripheral part of the effective pixel area of the solid-state image pickup device and a signal corresponding to a dark current is output from the pixels of the OB part such that the picked-up image signal is corrected as described in Patent Documents 1 to 4 below.

PRIOR ART DOCUMENT

Patent Literature

[Patent Document 1] JP 2000-152098 A
[Patent Document 2] JP 2008-118293 A
[Patent Document 3] JP 2009-033321 A
[Patent Document 4] JP 2010-068056 A

SUMMARY OF THE INVENTION

Problems to be Solved

In a recent solid-state image pickup device, a multi-pixellization has been achieved and a solid-state image pickup device having at least 10-megapixel mounted thereon is generally used. The 10-megapixel indicates the number of the pixels in an effective pixel area, and thus, when it is intended to secure an OB area or the number of pixels of the OB area for detecting a dark current at high precision, the solid-state image pickup device having a larger chip area needs to be prepared, thereby increasing cost. Therefore, the area of the OB part has to be narrowed.

Further, since a peripheral circuit serving as a heat generating source is fabricated on the same chip, the amount of heat generation of the peripheral circuit is reflected to the dark current, making it difficult to perform a dark current correction with an output signal of the OB pixels in the narrowed OB part at high precision by a driving pattern of the peripheral circuit. That is, a precision degree of a dark current correction is affected by a decision (i.e., a layout of the image pickup device chip) as to where the peripheral circuit or a driving circuit serving as a heat generating source is provided.

The present invention is intended to provide an image pickup apparatus that is capable of correcting the dark current at high precision without using a driving pattern of a peripheral circuit or a layout on an image pickup device chip, and a dark current correction method for the same.

Means for Solving Problem

According to an embodiment of the present invention, there is provided an image pickup apparatus, which includes: an image pickup device provided with an effective pixel area, an optical black part and a drive circuit of the image pickup device; a signal detection unit configured to detect a signal of the pixel of the optical black part and a signal of the pixel of the effective pixel area; a storage unit configured to store a correction pattern used for obtaining a second black level included in the detected signal of the effective pixel of the effective pixel area based on a first black level detected from the pixel of the optical black part by the signal detection unit in advance in accordance with an operation pattern of the drive circuit of the image pickup device; and a clamp unit configured to obtain the second black level from the correcting pattern read out from the storage unit and the first level, and subtracting the second black level as a clamp level from a level of the output signal of the effective pixel in accordance with the operation pattern of the drive circuit of the image pickup device.

According to another embodiment of the present invention, there is provided a dark current correction method for the image pickup apparatus which includes an image pickup device provided with an effective pixel area, an optical black part and a drive circuit of the image pickup device; a signal detection unit detecting a signal of the pixel of the optical black part and a signal of the pixel of the effective pixel area; a storage unit storing a correction pattern used for obtaining a second black level included in the detected signal of the effective pixel of the effective pixel area based on a first black level detected from the pixel of the optical black part by the signal detection unit in advance in accordance with an operation pattern of the drive circuit of the image pickup device. In the dark current correction method, the second black level is obtained from the correcting pattern read out from the storage unit and the first level and the second black level as a clamp level is subtracted from a level of the output signal of the effective pixel in accordance with the operation pattern of the drive circuit of the image pickup device.

Effect of Invention

According to the present invention, the clamp level of the clamping the output signal of the effective pixel is corrected based on the dark current difference even though a temperature difference between the effective pixel and the pixel of the optical black part is generated in accordance with the operation pattern of the solid-state image pickup device and the difference is generated between the dark currents of the effective pixel and the pixel of the optical black part. Therefore, it is possible to obtain a high quality image of the object without having a destroyed image.

DESCRIPTION OF THE PREFERRED EMBODIMENTS OF THE INVENTION

Hereinafter, an exemplary embodiment of the present invention will be described with reference to the accompanying drawings.

Figure 1:
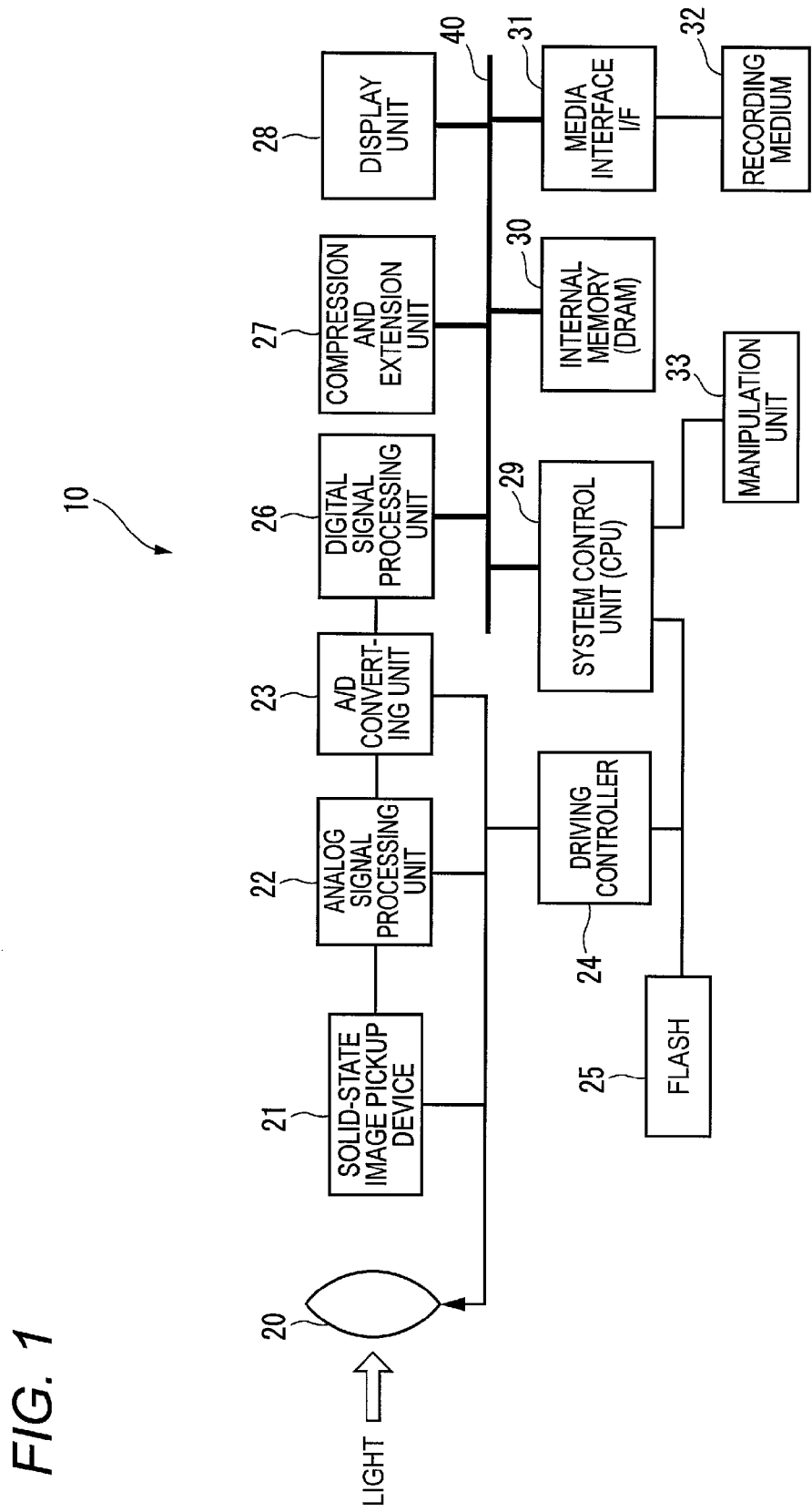
FIG. 1 is a functional block diagram illustrating an image pickup apparatus according to an exemplary embodiment of the present invention.

FIG. 1 is a functional block diagram illustrating an image pickup apparatus according to an exemplary embodiment of the present invention. A digital camera 10 of the present embodiment has a function of photographing a still image or moving image of an object and performing a digital processing of the picked-up image signal with in the digital camera 10. The digital camera 10 includes a photographing lens 20, a solid-state image pickup device 21 arranged behind the photographing lens 20 to be disposed in an imaging surface of the image pickup device, an analog signal processing unit 22 that performs an analog signal processing such as automatic gain adjustment (AGC) or correlated double sampling (CDC), on an analog image data output from the respective pixels of the solid-state image pickup device 21, and an analog-to-digital converting (A/D) unit 23 that converts the analog image data output from the analog signal processing unit 22 into digital image data. The digital camera 10 further includes a driving controller 24 that controls driving of the A/D unit 23, the analog signal processing unit 22, the solid-state image pickup device 21 and the photographing lens 20 in accordance with the instruction issued from a system control unit (CPU) 29, and a flash 25 emitting a light in accordance with the instruction issued from the CPU 29.

The digital camera 10 also includes a digital signal processing unit 26 that obtains digital image data output from the A/D unit 23 to perform an interpolation processing, a white balance correction processing, or RGB-YC conversion processing; a compression and extension unit 27 that compresses the image data into an image data of JPEG format and extends the compressed image data; a display unit 28 that displays a menu, a through-image or a picked up image; a system control unit (CPU) 29 that comprehensively manages and controls an entirety of the digital camera; an internal memory 30 such as a frame memory; a media interface (UF) unit 31 that interfaces with a recording medium 32 storing an image data in JPEG format; a bus 40 that interconnects these constitutional elements; and a manipulation unit 33 that is connected to the CPU 29 and used for inputting an instruction from a user.

The solid-state image pickup device 21 of the present embodiment is a CMOS type, and the output signal of the solid-state image pickup device 21 is processed by the analog signal processing unit (analog front end (AFE) 22. The AFE part (including a correlated double sampling processing circuit, a clamp circuit, a signal amplifying circuit performing a gain control, or the like) is generally provided on the solid-state image pickup device chip as a peripheral circuit. In addition, a horizontal scanning circuit, a vertical scanning circuit, a noise reducing circuit, a synchronization signal generating circuit, and the like are provided around the light receiving part on the solid-state image pickup device chip as a peripheral circuit, and the A/D unit 23 shown in FIG. 1 may be also provided around the light receiving part. The CPU 29 determines a black level (a second black level) close to a black level (first black level) detected from the OB pixels based on the black level as described below. The clamp circuit performs a processing (clamping) in which the second black level as a component of the dark current is subtracted from the signal detected by the pixels in the effective pixel area.

Figure 2:
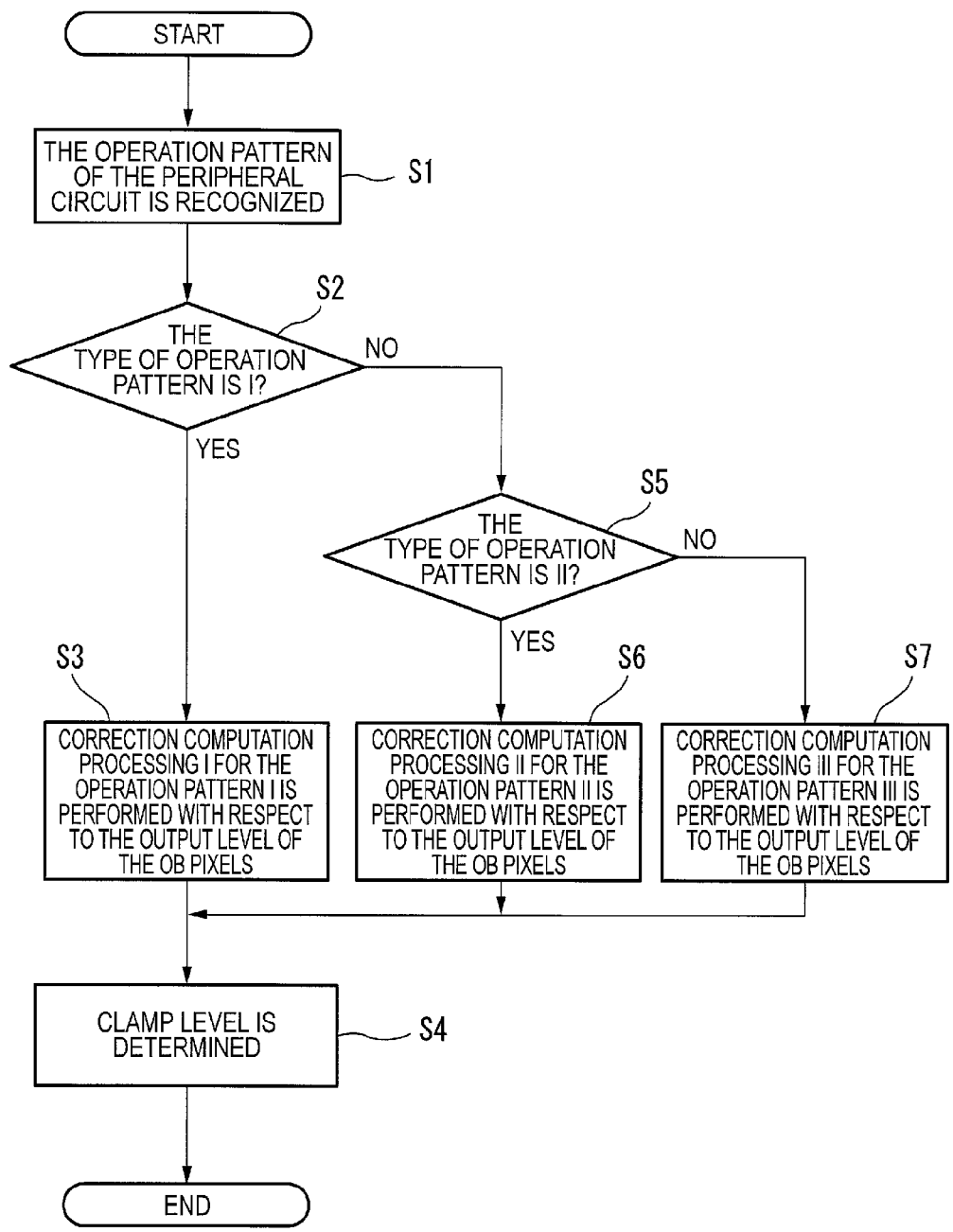
FIG. 2 is a flow chart illustrating a sequence of a clamp level determination process executed by CPU of FIG. 1.

FIG. 2 is a flow chart illustrating a sequence of a clamp level (black level) determination process in which the clamp level is determined when the CPU 29 controls the clamp circuit through the driving controller 24.

First, at step S1, the operation pattern of the peripheral circuit formed on the chip of the solid-state image pickup device 21 is recognized. The operation pattern is determined in accordance with an operation instruction for the solid-state image pickup device 21 issued by the CPU 29 to the driving controller 24.

A position in the solid-state image pickup device chip on which the peripheral circuit is arranged is determined depending upon the layout of the chip. The number of types of the operation pattern existing in the solid-state image pickup device depends upon the layout. In this example, it is explained on the assumption that three types of the operation patterns I, II and III exist.

At step S2 after the step S1, it is determined whether the type of operation pattern is I or not. If it is determined that the type of operation pattern is I, the process proceeds to step S3 and a correction computation processing I for the operation pattern I is performed with respect to the output level of the OB pixels. The process then proceeds to step S4 and the clamp level calculated by the correction computation processing I is determined, and the clamp level determination process for the operation pattern I is completed.

If it is determined at step S2 that the type of operation pattern is not I, it is determined whether the type of operation pattern is II or not, at step S5. If it is determined that the operation pattern is II, the process proceeds to step S6 and a correction computation processing II for the operation pattern II is performed with respect to the output level of the OB pixels. The process then proceeds to step S4 and a clamp level calculated by the correction computation processing II is determined, and the clamp level determination process for the operation pattern II is completed.

If it is determined at step S5 that the type of operation pattern is not II, the type of the operation pattern is recognized as III, and the process proceeds to step S7. In the step S7, a correction computation processing III for the operation pattern III is performed with respect to the output level of the OB pixels. The process then proceeds to step S4 and a clamp level calculated by the correction computation processing III is determined, and the clamp level determination process for the operation pattern III is completed.

As described above, a clamp level (black reference level) of the image data of the object is changed based on the operation pattern of the solid-state image pickup device 21 and a different dark current correction is performed for each operation pattern in the present embodiment.

In FIG. 2, the number of types of the operation patterns is assumed to be three types. Since the operation pattern to be utilized is determined in accordance with a layout of the image pickup device in advance, any number of the types of the operation patterns may be adopted. In the following description, the present embodiment is described with a specific example. For simplification, the number of types of the operation is set to two types.

Figure 3:
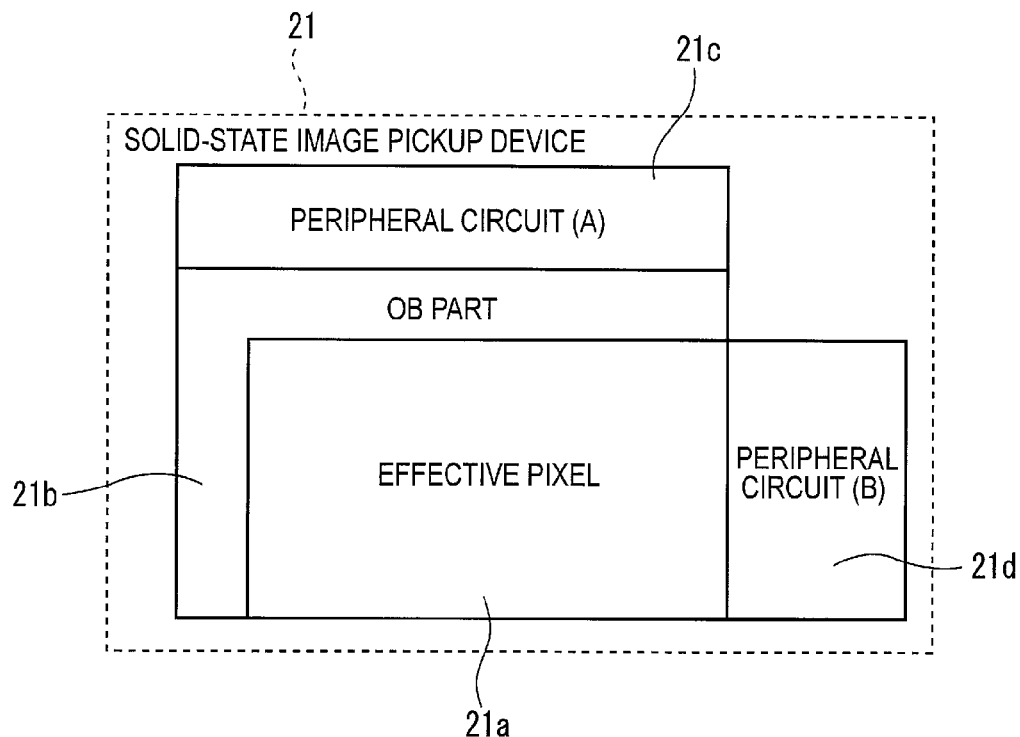
FIG. 3 is a diagram illustrating an example of a layout of the solid-state image pickup device shown in FIG. 1.

FIG. 3 is a diagram illustrating an example of a layout of a surface of the solid-state image pickup device 21 of FIG. 1. A rectangular effective pixel area 21a is provided from a central portion to a lower portion of the solid-state image pickup device chip. In the conventional solid-state image pickup device, the OB parts are provided all around the periphery of the effective pixel area. However, in the illustrated example of the layout of FIG. 3, the OB part 21b is provided adjacent to the left portion and upper portion of the effective pixel area 21a. Further, a peripheral circuit (A) 21c is provided adjacent to the OB part 21b which is provided adjacent to the upper portion, and a peripheral circuit (B) 21d is provided directly adjacent to the right portion of the effective pixel area 21a.

Figure 4:
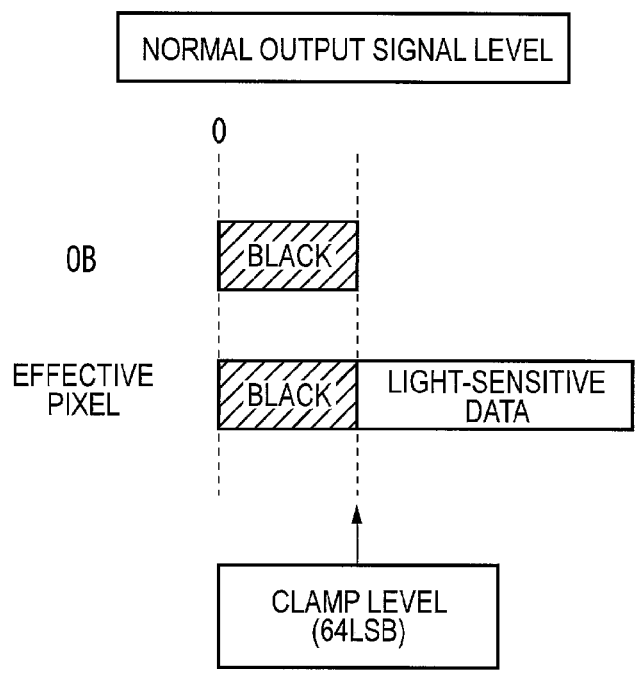
FIG. 4 is a diagram illustrating a case where a black level of the OB pixel and that of the effective pixel are equal to each other.

As in the conventional solid-state image pickup device, when a large chip area can be occupied by the OB part, and the OB part may be provided at an area far away from the peripheral circuit serving as a heat generation source, as illustrated in FIG. 4, a sum of the black level and amount of dark current detected from the OB pixels becomes equal to a sum of black level and amount of dark current of the effective pixels (i.e., pixels in the effective pixels area). Accordingly, when the sum of the black level and the amount of dark current is set as a clamp level, a black reference level can be determined at high precision. When the clamp level is determined, an adjustment is performed so that the clamp level corresponds to 64 LSB of the 1024 gradations of 10 bits.

In such a layout illustrated in FIG. 3, when the peripheral circuit (A) 21c is driven at high speed and an amount of heat generation increases, the temperature of the OB pixels adjacent to the peripheral circuit (A) 21c is increased to be higher than that of the effective pixels, thereby increasing the dark current. Meanwhile, when the peripheral circuit (B) 21d is driven at high speed and an amount of heat generation increases, the temperature of the effective pixels directly adjacent to the peripheral circuit (B) 21d is increased to be higher than that of the OB pixels spaced apart from the peripheral circuit (B) 21d, thereby increasing the dark current.

As described above, a further dark current difference occurs upon long time exposure or application of high gain in the solid-state image pickup device in which temperature difference between the effective pixels area and the OB part, that is, the dark current difference occurs according to the type of the operation pattern. As a result, an image quality of the object becomes seriously deteriorated unless the dark current difference is corrected at high precision.

Figure 5:
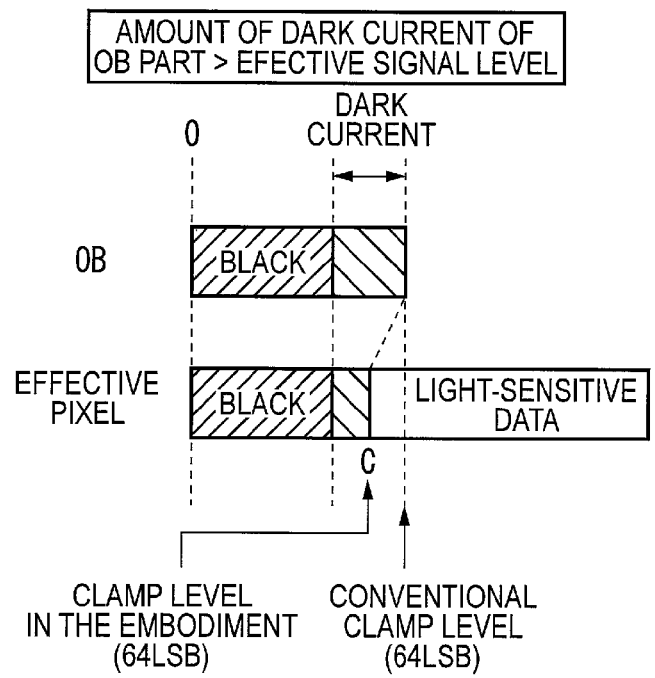
FIG. 5 is a diagram illustrating a case where the black level (including a dark current) of the effective pixel is smaller than that of the OB pixel.

FIG. 5 illustrates the sum of black level and amount of dark current of each of the OB pixel and effective pixel in a case where the dark current of the OB pixel is larger than that of the effective pixel. An actual black level and actual amount of dark current included in the output signal of the OB pixel cannot be separately detected but can be detected with both being mixed with each other as the sum of the black level and the amount of dark current.

When the output level of the OB pixel, which is the detected black level including the actual black level and actual amount of dark current, is clamped by the clamping circuit and subtracted from the output signal of the effective pixel, a part of the light sensitive data (an actual imaging signal corresponding to an amount of an incident light) is also removed. In a case where the temperature is further increased due to long time exposure in addition to the heat generation of the peripheral circuit and the black level becomes 64 LSB or more by only the dark current, the light sensitive data having undergone a clamping becomes 0 LSB or less, thereby destroying the image.

Therefore, in the present embodiment a correction computation processing in which a location (position of point C) at which the output signal of the effective pixel becomes the sum of black level and the amount of dark current is obtained, is performed for the output level of the OB pixels by using an equation (correction pattern) described below, and the clamp level is determined.

The above mentioned equation may be obtained by performing an experiment or a simulation for each driving mode (operation pattern) of the solid-state image pickup device and stored in a rewritable ROM (not shown) of the CPU 29 in advance. The location of point C can be calculated from the output level of the OB pixels using the equation. The correction pattern may be stored in a memory provided on an image pickup device chip or an image pickup device module.

Figure 6:
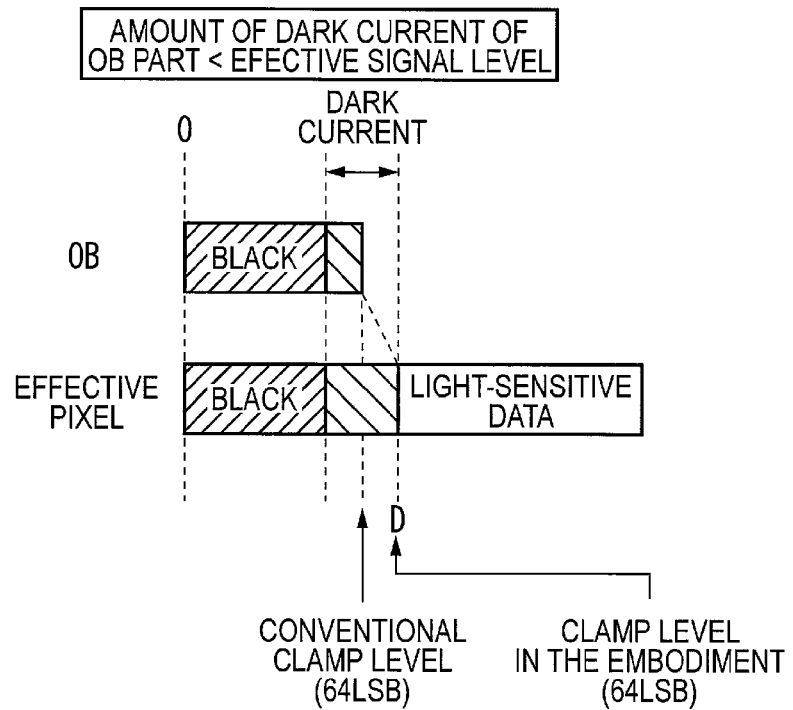
FIG. 6 is a diagram illustrating a case where the black level (including a dark current) of the effective pixel is larger than that of the OB pixel.

FIG. 6 illustrates a case where the dark current of the effective pixel is larger than that of the OB pixel. In this case, when the signal of the effective pixel is clamped to the output level of the OB pixel, it is clamped to a location at which the dark current difference is added to the light sensitive data. In a case where the temperature is increased by the long time exposure and the dark current is increased, a saturation area for the light sensitive data becomes small, thereby destroying the image as well.

Therefore, in the present embodiment, as in the case of the FIG. 5, for the output level of the OB pixels, a correction computation processing in which a location (position of point D) at which the output signal of the effective pixel becomes the sum of the black level and the amount of dark current is obtained, is performed using the equation, and the clamp level is determined.

Figure 7:
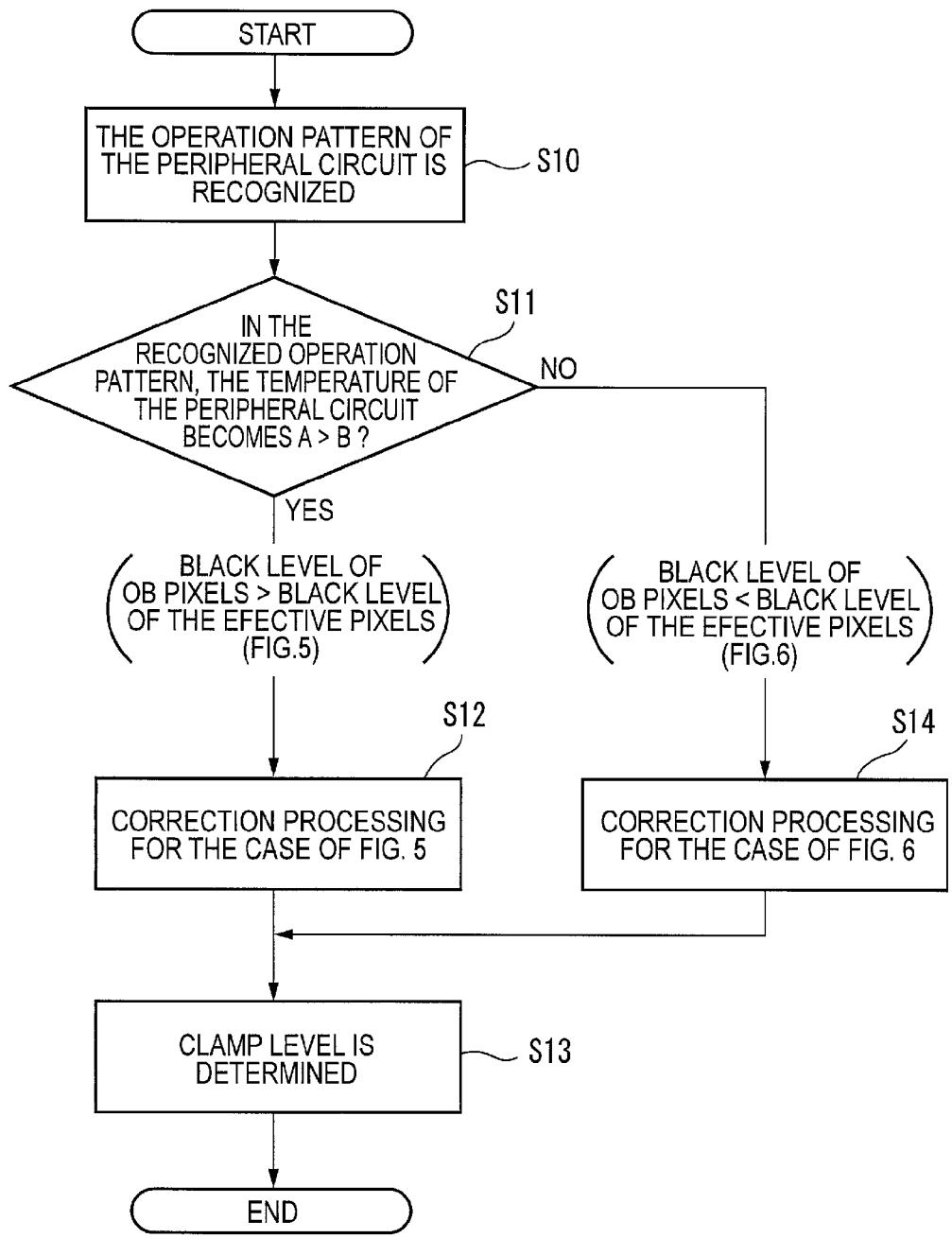
FIG. 7 is a flow chart illustrating a sequence of a clamp level determination process in the solid-state image pickup device having the operational patterns as shown in FIGS. 5 and 6.

FIG. 7 is a flow chart illustrating processing sequences for determining each case of FIGS. 5 and 6 and performing an appropriate clamp level determination for the cases. First, at step S10, the operation pattern of the peripheral circuits as shown in FIG. 3 is recognized. Subsequently, at step S11, it is determined whether the type of operation pattern corresponds to an operation pattern in which temperature of the peripheral circuit A is larger than that of the peripheral circuit B. For example, it is determined whether the temperature of the peripheral circuit A is higher or lower than that of the peripheral circuit B by estimating an amount of heat generation in accordance with the driving conditions such as whether the peripheral circuits A and B are being driven at high speed, are being exposed for a long time and a high gain is being applied or not.

When the operation pattern corresponds to an operation pattern in which temperature of the peripheral circuit A is larger than that of the peripheral circuit B, the black level of OB pixels is larger than that of the effective pixels, and thus, the process proceeds to step S12 and a correction computation processing for the case of FIG. 5 is performed. Subsequently, at step S13, a clamp level determination processing is performed and the clamp level determination process is completed.

If it is determined at step S11 that the operation pattern corresponds to an operation pattern in which the temperature of the peripheral circuit B is equal to or larger than that of the peripheral circuit A, the black level of the OB pixels is larger than that of the effective pixels ⌐, and thus, the process proceeds from step S11 to step S14 and a correction computation processing for the case of FIG. 6 is performed. Subsequently, at step S13, a clamp level determination processing is performed, and the clamp level determination process is completed.

Figure 8:
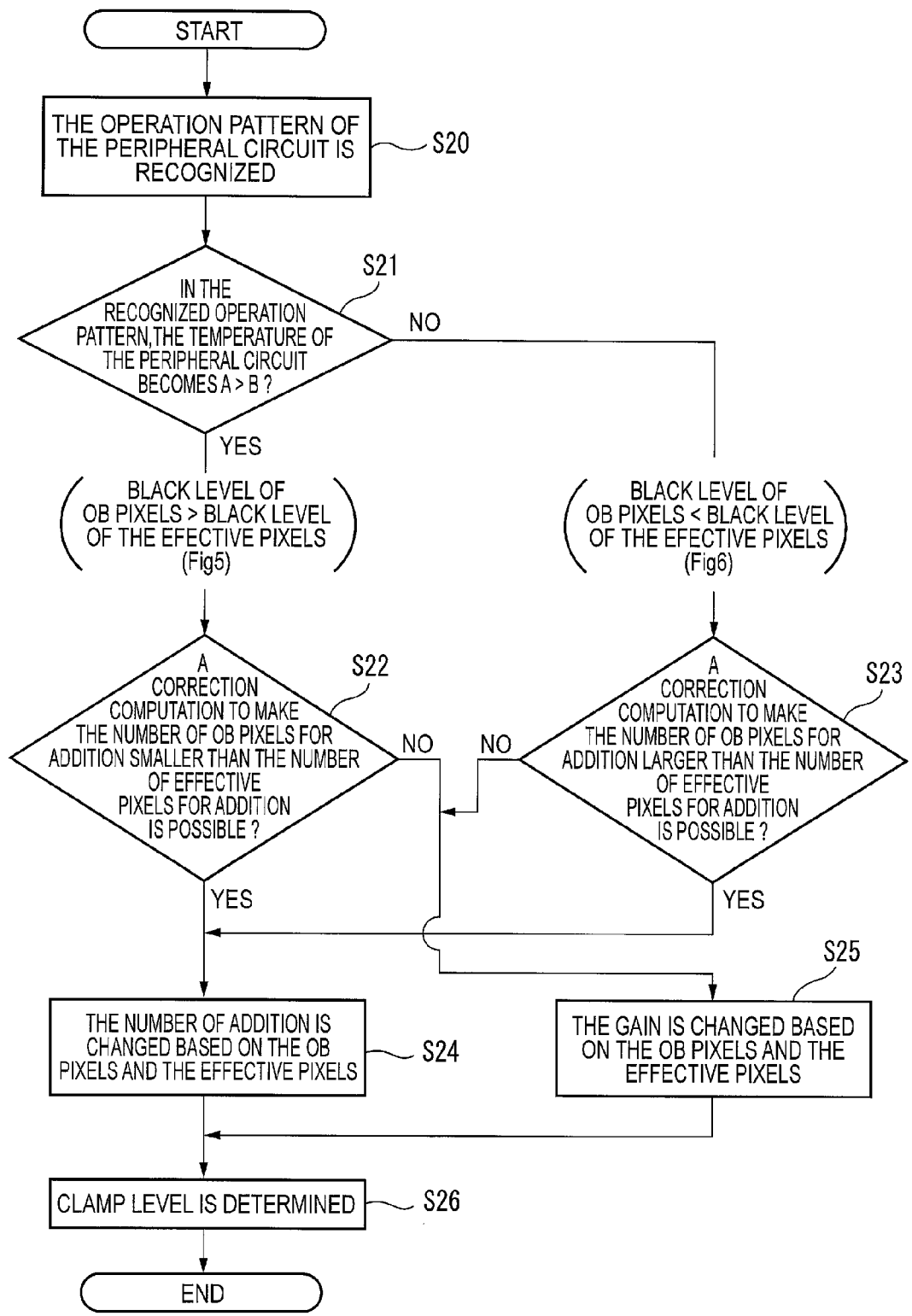
FIG. 8 is a flow chart illustrating a sequence of a clamp level determination process by determining a clamp level through an adjustment of the number of pixels for addition and adjustment of gain in the solid-state image pickup device having the operational patterns as shown in FIGS. 5 and 6.

FIG. 8 is a flow chart illustrating a sequence of a clamp level determination process according to another exemplary embodiment. In the example described above, the locations of point C of FIG. 5 and point D of FIG. 6 for the output level of the OB pixels are obtained by using an equation which is obtained in advance. However, the clamp level can be obtained more easily in the clamp level determination process of FIG. 8 as compared with cases of FIGS. 5 and 6 where those equations obtained in advance are used.

For example, in the case of FIG. 4, when eight effective pixels is added and output, the result of the addition of eight OB pixels becomes the clamp level of the black level when adding the eight effective pixels. Meanwhile, in the case of FIG. 5, the clamp level when adding the eight effective pixels becomes small as compared to a case when adding eight OB pixels, and thus, for example, the addition of seven effective pixels or six effective pixels may be performed. In the case of FIG. 6, the number of effective pixels for addition becomes larger than the number of OB pixels for addition, which is contrary to the case of FIG. 5.

Figure 9:
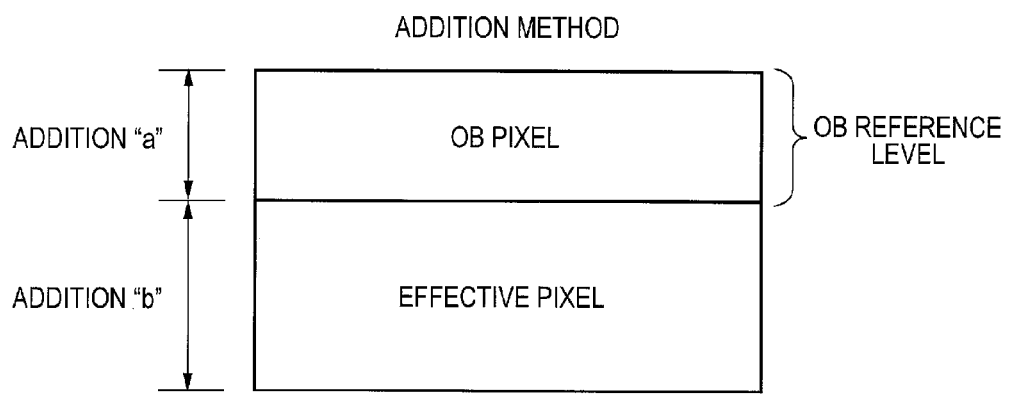
FIG. 9 is an explanation drawing of the correction by the adjustment using the number of pixels for addition in FIG. 8.

That is, as shown in FIG. 9, when the number of OB pixels "a" for addition set as the black reference level and the number of effective pixels "b" for addition are determined in advance for each operation pattern, the correction of the dark current can be achieved at high precision by controlling the number of pixels for addition. The relationship of the number of pixels for addition between the OB pixel and the effective pixels may be obtained for each of the operation pattern of the solid-state image pickup device in advance by performing an experiment or simulation. In case of CMOS type solid-state image pickup device, the number of OB pixels for addition and that of effective pixels for addition may be determined arbitrarily and individually.

When the dark current component which is equal to or more than the sum of the black level and the amount of dark current of single pixel needs to be corrected, the dark current component can be corrected by using the number of pixels for addition. However, when dark current component which is equal to or less than an amount of single pixel needs to be corrected, the correction by using the number of pixels for addition cannot be controlled at high precision.

Figure 10:
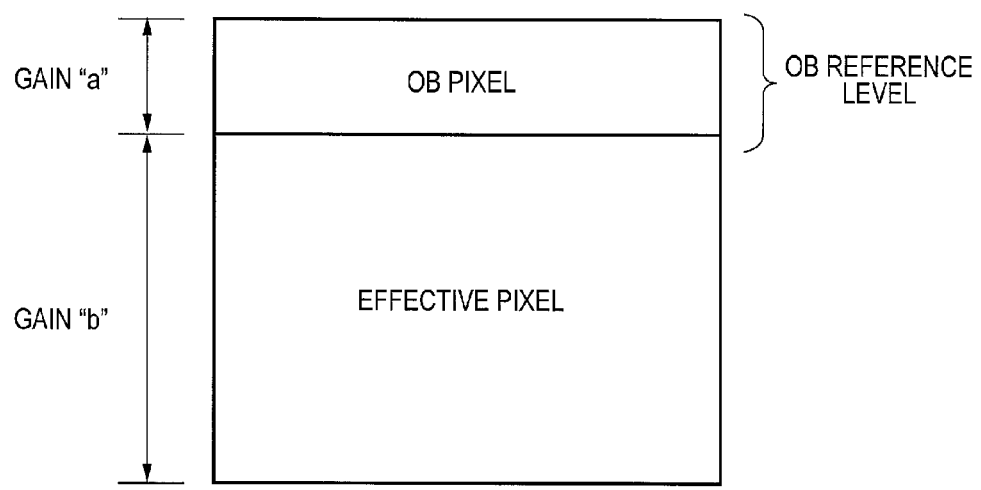
FIG. 10 is an explanation drawing of the correction by the gain adjustment in FIG. 8.

In this case, the correction is performed by changing the gain "a" with respect to the output signal of the OB pixels with the gain "b" with respect to the output signal of the effective pixels as shown in FIG. 10. The adjustment of the gain is performed with automatic gain control (AGC) function of the analog signal processing circuit 22 of FIG. 1.

For example, in FIG. 5, when a gain control with "1" of gain is performed on the output signal of the effective pixels, a gain control with "0.8" of gain is performed on the output signal of the OB pixels, thereby determining a clamp level.

FIG. 8 is a flow chart illustrating a processing sequence for determining a clamp level based on the above-mentioned principle. In the processing sequences of FIG. 8, the operation pattern of the peripheral circuit is recognized first at step S20. It is determined at step S21 whether the type of operation pattern corresponds to an operation pattern in which the temperature of the peripheral circuit A is larger than that of the peripheral circuit B.

When the operation pattern corresponds to an operation pattern of FIG. 5 in which the temperature of the peripheral circuit A is larger than that of the peripheral circuit B, the black level of OB pixels is larger than that of the effective pixels, and thus, the process proceeds to step S22. When the operation pattern corresponds to an operation pattern of FIG. 6 in which the temperature of the peripheral circuit B is equal to or larger than that of the peripheral circuit A, the black level of the OB pixels is smaller than that of the effective pixels and thus, the process proceeds to step S23.

At step S22, it is determined whether a correction computation to make the number of OB pixels for addition smaller than the number of effective pixels for addition is possible. If it is determined that the correction computation is possible, the process proceeds to step S24. Otherwise, the process proceeds to step S25.

At step S23, it is determined whether a correction computation to make the number of OB pixels for addition larger than the number of effective pixels for addition is possible. If it is determined that the correction computation is possible, the process proceeds to step S24. Otherwise, the process proceeds to step S25.

At step S24, since the correction using the number of pixels for addition becomes possible, the correction computation processing is performed in which the number of OB pixels for addition and the number of effective pixels for addition are changed. Specifically, in a case where the operation pattern in which the temperature of the pixel of the optical black part becomes higher than that of the effective pixels, the gain to be applied to the output signal is made such that gain to be applied to the effective pixels becomes larger than that of the pixel of OB part. In contrast, in a case where the operation pattern in which the temperature of the pixel of the optical black part becomes lower than that of the effective pixels, the gain to be applied to the output signal is made such that gain to be applied to the effective pixels becomes smaller than that of the pixel of OB par, thereby obtaining a first black level. A second black level is obtained based on the obtained first black level. Subsequently, the clamp level is determined at step S26, and the clamp level determination process is completed.

At step S25, since the correction using the number of pixels for addition is impossible, the correction computation processing is performed in which the gain to be applied to the OB pixels and the effective pixels are changed. Subsequently, the clamp level determination process is performed at step S26, and the clamp level determination process is completed.

The image pickup apparatus according to the above-mentioned embodiment as described above includes an image pickup device provided with an effective pixel area, an optical black part and a drive circuit of the image pickup device; a signal detection unit detecting a signal of the pixel of the optical black part and a signal of the effective pixel area; a storage unit storing a correction pattern used for obtaining a second black level included in the detected signal of the effective pixel of the effective pixel area based on a first black level detected from the pixel of the optical black part by the signal detection unit in advance in accordance with an operation pattern of the drive circuit of the image pickup device. In the dark current correction method of the image pickup apparatus, the second black level is obtained from the correcting pattern read out from the storage unit and the first level in accordance with the operation pattern of the drive circuit of the image pickup device, and the second black level as a clamp level is subtracted from a level of the output signal of the effective pixel.

Further, in the image pickup apparatus and the dark current correction method for the image pickup apparatus according to the embodiment, the signal detection unit adds a plurality of pixels in the optical black part and in the effective pixel area and detects the respective signals of the pixel of the optical black part and the effective pixel area. The correction pattern, in a case where the operation pattern in which the temperature of the pixels of the optical black part becomes higher than that of the effective pixels, adjusts the number of pixels for addition of the OB part to be fewer than that of the effective pixels, and in a case where the operation pattern in which the temperature of the pixels of the optical black part becomes lower than that of the effective pixels, adjusts the number of pixels for addition of the OB part to be more than that of the pixel of the effective pixels, and as a result, the first black level is obtained. A second black level is obtained based on the obtained first black level.

Further, in the image pickup apparatus and the dark current correction method for the image pickup apparatus according to the embodiment, the signal detection unit performs the correction computation processing in which the respective gains applied for the signals of the pixels of the OB part and the effective pixel area are changed. The correction pattern, in a case of the operation pattern in which the temperature of the pixel of the optical black part becomes higher than that of the effective pixels, adjusts the gain to be applied to the output signal such that the gain to be applied to the effective pixels becomes larger than that of the pixel of OB part, and in a case of the operation pattern in which the temperature of the pixel of the optical black part becomes lower than that of the effective pixels, adjusts the gain to be applied to the output signal such that the gain to be applied to the effective pixels becomes smaller than that of the pixel of OB part. And, as a result, a first black level is obtained. A second black level is obtained based on the obtained first black level.

Further, the correction pattern of the image pickup apparatus and the dark current correction method for same according to the embodiment may be obtained by performing an experiment or a simulation for each operation pattern of the solid-state image pickup device and stored in the storage unit in advance.

According to the embodiment described above, the peripheral circuit is provided on the solid-state image pickup device chip in which the light receiving pixel part and the optical black part is provided, such that even when the temperature difference between the light receiving pixel part and the optical black part is occurred, the amount of dark current of the light receiving pixel part can be corrected at high precision based on the amount of dark current detected from the optical black pixels. Therefore, a high quality image of the object can be obtained under various picture taking conditions such as, for example, a long time exposure or a high gain application time.

INDUSTRIAL APPLICABILITY

According to the dark current correction method of the present invention, even when a difference is generated in the amount of dark current component between the optical black part and the effective pixels due to the non-uniform temperature distribution in the light receiving surface, the dark current can be corrected at high precision and the high quality image of the object can be obtained. Therefore, the dark current correction method of the present invention is useful when applied to a general digital camera such as a digital still camera or digital video camera, an endoscopic camera, and a mobile phone having a built-in camera.

This application is based on and claims priority from Japanese Patent Application No. 2011-244824, filed on Oct. 29, 2010, the disclosure of which is incorporated herein in its entirety by reference.

EXPLANATION OF REFERENCE NUMBER 10 imaging device
21 solid-state image pickup device
21a effective pixel
21b OB part
21c, 21d peripheral circuits
22 analog signal processing unit (including a correlated double sampling circuit, clamp circuit, a gain adjustment circuit)
24 driving controller
26 digital signal processing unit
29 system control unit (CPU)

The invention claimed is:

1. An image pickup apparatus, comprising:
an image pickup device in which an effective pixel area, an optical black part and a drive circuit for the image pickup device are formed;
a signal detection unit that detects a signal of the pixel of the optical black part and a signal of the pixel of the effective pixel area;
a storage unit that previously stores a correction pattern used for obtaining a second black level included in the detected signal of the effective pixel of the effective pixel area based on a first black level detected from the pixel of the optical black part by the signal detection unit in accordance with an operation pattern of the drive circuit of the image pickup device;
and a clamp unit that obtains the second black level from the correcting pattern read out from the storage unit in accordance with the operation pattern of the drive circuit of the image pickup device and the first black level, and subtracts the second black level as a clamp level from a level of the output signal of the effective pixel,
wherein the signal detection unit adds a plurality of pixels in the optical black part and in the effective pixel area and detects the respective signals of the pixel of the optical black part and the effective pixel area,
wherein the correction pattern, in a case where the operation pattern is a pattern in which the temperature of the pixels of the optical black part becomes higher than that of the effective pixels, adjusts the number of pixels for addition of the optical black part to be fewer than that of the effective pixels, and, in a case where the operation pattern is a pattern in which the temperature of the pixels of the optical black part becomes lower than that of the effective pixels, adjusts the number of pixels for addition of the optical black part to be more than that of the pixel of the effective pixels, such that the first black level is obtained,
and wherein the second black level is obtained based on the obtained first black level.

2. The image pickup apparatus of claim 1, wherein the signal detection unit performs the correction computation processing in which the respective gains for the signals of the pixels of the optical black part and the effective pixel area are changed, wherein the correction pattern, in a case where the operation pattern is a pattern in which the temperature of the pixel of the optical black part becomes higher than that of the effective pixels, adjusts the gain to be applied to the output signal such that the gain to be applied to the effective pixels becomes larger than that of the pixel of the optical black part, and in a case where the operation pattern is a pattern in which the temperature of the pixel of the optical black part becomes lower than that of the effective pixels, adjusts the gain to be applied to the output signal such that the gain to be applied to the effective pixels becomes smaller than that of the pixel of the optical black part, thereby obtaining the first black level, and wherein the second black level is obtained based on the obtained first black level.

3. The image pickup apparatus of claim 1, wherein the correction pattern is obtained by performing an experiment or a simulation for each operation pattern of the solid-state image pickup device and stored in the storage unit in advance.

4. A dark current correction method for an image pickup apparatus which includes an image pickup device in which an effective pixel area, an optical black part and a drive circuit of the image pickup device are formed, said method comprising:

detecting, using a signal detection unit, a signal of the pixel of the optical black part and a signal of the pixel of the effective pixel area;

storing, using a storage unit, a correction pattern used for obtaining a second black level included in the detected signal of the effective pixel of the effective pixel area based on a first black level detected from the pixel of the optical black part by the signal detection unit in advance in accordance with an operation pattern of the drive circuit of the image pickup device, wherein the second black level is obtained from the correction pattern read out from the storage unit in accordance with the operation pattern of the drive circuit of the image pickup device and the first black level, and the second black level as a clamp level is subtracted from a level of the output signal of the effective pixel, wherein the signal detection unit adds a plurality of pixels in each of the optical black part and the effective pixel area and detects the respective signals of the pixel of the optical black part and the effective pixel area, wherein the correction pattern, in a case where the operation pattern is a pattern in which the temperature of the pixels of the optical black part becomes higher than that of the effective pixels, adjusts the number of pixels for addition of the optical black part to be fewer than that of the effective pixels, and in a case where the operation pattern is a pattern in which the temperature of the pixels of the optical black part becomes lower than that of the effective pixels, adjusts the number of pixels for addition of the optical black part to be more than that of the pixel of the effective pixels, such that the first black level is obtained, and wherein the second black level is obtained based on the obtained first black level.

5. The dark current correction method of claim 4, wherein the signal detection unit performs the correction computation processing in which the respective gains for the signals of the pixels of the optical black part and the effective pixel area are changed, wherein the correction pattern, in a case where the operation pattern is a pattern in which the temperature of the pixel of the optical black part becomes higher than that of the effective pixels, adjusts the gain to be applied to the output signal such that the gain to be applied to the effective pixels becomes larger than that of the pixel of optical black part, and in a case where the operation pattern is a pattern in which the temperature of the pixel of the optical black part becomes lower than that of the effective pixels, adjusts the gain to be applied to the output signal such that the gain to be applied to the effective pixels becomes smaller than that of the pixel of optical black part, thereby obtaining the first black level, and wherein the second black level is obtained based on the obtained first black level.

6. The dark current correction method of claim 4, wherein the correction pattern is obtained by performing an experiment or a simulation for each operation pattern of the solid-state image pickup device and stored in the storage unit in advance.

* * * * *